(12) United States Patent
McEwen et al.

(10) Patent No.: US 6,810,485 B2
(45) Date of Patent: Oct. 26, 2004

(54) DETERMINING THE TIMING OF A DATA SIGNAL

(75) Inventors: Peter McEwen, Santa Clara, CA (US); Ara Patapoutian, Westborough, MA (US); Ke Han, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 696 days.

(21) Appl. No.: 09/755,252

(22) Filed: Jan. 4, 2001

(65) Prior Publication Data

US 2002/0087910 A1 Jul. 4, 2002

(51) Int. Cl.[7] .................................................. G06F 1/04
(52) U.S. Cl. ...................................... 713/503; 713/400
(58) Field of Search ................................ 713/400, 401, 713/500, 503, 600; 369/47.28, 59.19, 59.2, 59.21, 59.22

(56) References Cited

U.S. PATENT DOCUMENTS

| | | | |
|---|---|---|---|
| 5,452,325 A | | 9/1995 | Brown et al. ............... 375/376 |
| 6,009,549 A | * | 12/1999 | Bliss et al. .................. 714/769 |
| 6,205,095 B1 | * | 3/2001 | Hisakado et al. ......... 369/47.25 |
| 6,236,343 B1 | | 5/2001 | Patapoutian ................ 341/111 |
| 6,615,361 B1 | * | 9/2003 | Patapoutian ................ 713/503 |
| 2002/0116667 A1 | * | 8/2002 | McEwen et al. ............. 714/39 |

\* cited by examiner

*Primary Examiner*—Dennis M. Butler
(74) *Attorney, Agent, or Firm*—David M. Sigmond

(57) ABSTRACT

Determining a phase error in a data signal includes detecting bits in an original data signal, determining a phase error in the original data signal based on the detected bits, adjusting a clock signal based on the phase error, sampling the original data signal with the clock signal to produce a sampled data signal, and repeating detecting, determining, adjusting and sampling using the sampled data signal instead of the original data signal.

45 Claims, 7 Drawing Sheets

DETERMINING THE TIMING OF A DATA SIGNAL

TECHNICAL FIELD

This invention relates generally to determining the timing of a data signal and, more particularly, to buffered architectures for determining the timing.

BACKGROUND

Phase-locked loops (PLLs) operate in a system, such as a disk drive, to synchronize the system and to improve signal-to-noise (SNR) ratios in the system. In a buffered architecture disk drive, an analog signal is read from a storage medium, such as a computer hard disk, and is digitized using an analog-to-digital (A/D) converter. The resulting asynchronous digital data is stored in a buffer, from which the asynchronous digital data is sampled. A clock signal controls the sampling to produce synchronous digital data. If the clock signal is out of phase with the synchronous digital data, errors may result in the output digital data.

SUMMARY

In general, in one aspect, the invention is directed to determining a phase error in a data signal having first phase bits, second phase bits, and data between the first and second phase bits. This aspect of the invention features obtaining a first phase based on the first phase bits, obtaining a second phase based on the second phase bits, and determining a phase error of the data based on the first and second phases. One advantage of this aspect of the invention is that the phase error of the data can be determined from information in the data signal itself.

This aspect of the invention may include one or more of the following features. The first phase bits define a first function and the first phase is obtained by determining the phase of the first function. The second phase bits define a second function and the second phase is obtained by determining the phase of the second function. The phase error is determined by performing an interpolation, such as linear interpolation, using the first and second phases. The first and second phase bits may be parts of first and second data preambles, respectively.

This aspect may also include storing the data signal in a buffer, adjusting a clock signal based on the phase error, sampling the data from the buffer using the clock signal, detecting bits in the sampled data, obtaining a phase difference between a first waveform that corresponds to the detected bits and a second waveform that corresponds to the sampled data, and adjusting the clock signal based on the phase difference. The data may be re-sampled from the buffer using the clock signal, and then stored in another buffer, from which it is sampled.

In general, in another aspect, the invention is directed to determining a phase error in a data signal. This aspect of the invention features detecting bits in an original data signal, determining a phase error in the original data signal based on the detected bits, adjusting a clock signal based on the phase error, sampling the original data signal with the clock signal to produce a sampled data signal, and repeating detecting, determining, adjusting and sampling using the sampled data signal instead of the original data signal. By repeating the process, it is possible to iteratively determine timing, increasing its accuracy at each iteration.

This aspect of the invention may also include one or more of the following features. The phase error is determined by comparing a waveform that corresponds the detected bits to a waveform that corresponds to the original data signal. The original data signal includes synchronously data sampled from a buffer. A Viterbi detector, or other type of detector, may be used to perform the detecting.

In general, in another aspect, the invention is directed to determining a phase error in a data signal stored in a buffer. This aspect of the invention features detecting bits in an original data signal and determining a phase error in the original data signal based on the detected bits using a smoothing technique. The smoothing technique takes data before and after the bits into account, thereby increasing the accuracy of determination of the phase error.

This aspect of the invention may include one or more of the following features. The smoothing technique may be Kalman smoothing and may include determining a first phase difference between waveforms corresponding to the original data signal and the detected bits at first corresponding locations in the original data signal and the detected bits, determining a second phase difference between waveforms corresponding to the original data signal and the detected bits at second corresponding locations in the original data signal and the detected bits, and determining the phase error by obtaining a weighted value that is based on the first and second phase differences and the first and second corresponding locations.

The phase error, $\theta_k$, for a "$k^{th}$" data bit, may be determined as follows:

$$\theta_k = \alpha_k^1 \theta_k^1 + \alpha_k^2 \theta_k^2,$$

where $\theta_k^1$ is the first phase difference, $\alpha_k^1$ is a weight assigned to the first corresponding locations, $\theta_k^2$ is the second phase difference, and $\alpha_k^2$ is a weight assigned to the second corresponding locations. Values for $\alpha_k^1$ and $\alpha_k^2$ are assigned based on the first and second corresponding locations, respectively.

The details of one or more embodiments of the invention are set forth in the accompanying drawings and the description below. Other features and advantages of the invention will be apparent from the following description, drawings and claims.

DETAILED DESCRIPTION

Figure 1:
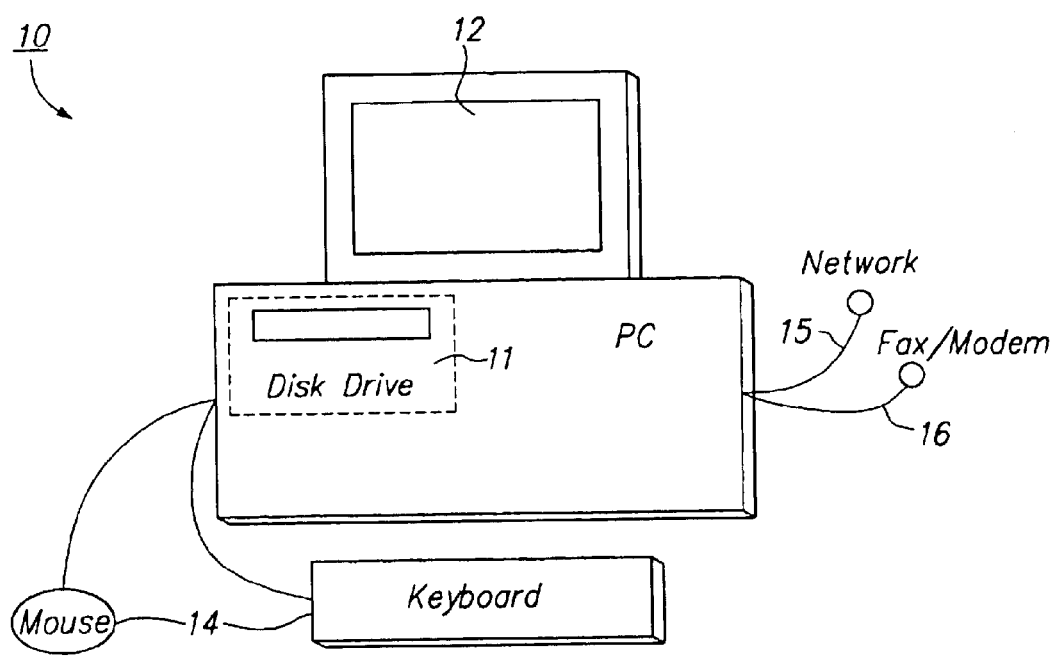
FIG. 1 is a perspective view of a personal computer that includes a disk drive.

FIG. 1 shows a personal computer (PC) 10. PC 10 includes a disk drive 11, a display screen 12, which displays information to a user, and input devices 14 which input data. Network interface 15 and fax/modem interface 16 are also provided which connect PC 10 to a network (not shown).

Figure 2:
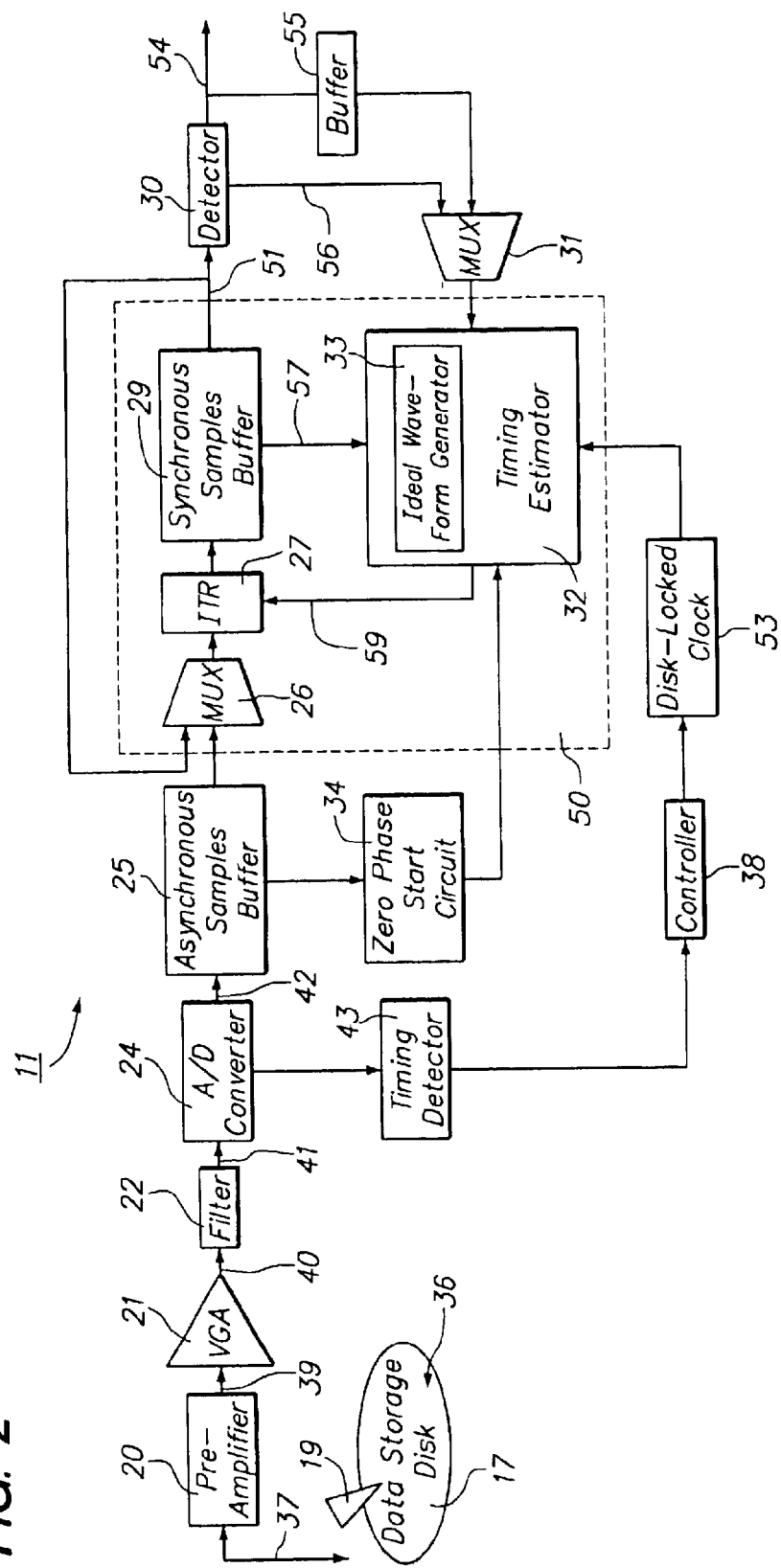
FIG. 2 is a block diagram showing representative components of the disk drive.

Disk drive 11 has a buffered architecture, as shown in FIG. 2. This means that sampled data is stored, at least temporarily, in one or more buffers prior to output. Among the components of disk drive 11 are data storage disk 17, transducer head 19, pre-amplifier 20, analog variable gain amplifier (VGA) 21, filter 22, A/D (Analog-to-Digital) converter 24, asynchronous samples buffer 25, multiplexer 26, interpolated timing recovery circuit (ITR) 27, synchronous samples buffer 29, detector 30, timing estimator 32, and zero phase start circuitry 34. The foregoing circuitry may be implemented as one or more circuit elements, such as an ASIC (Application-Specific Integrated Circuit) or logic gates.

Figure 3:
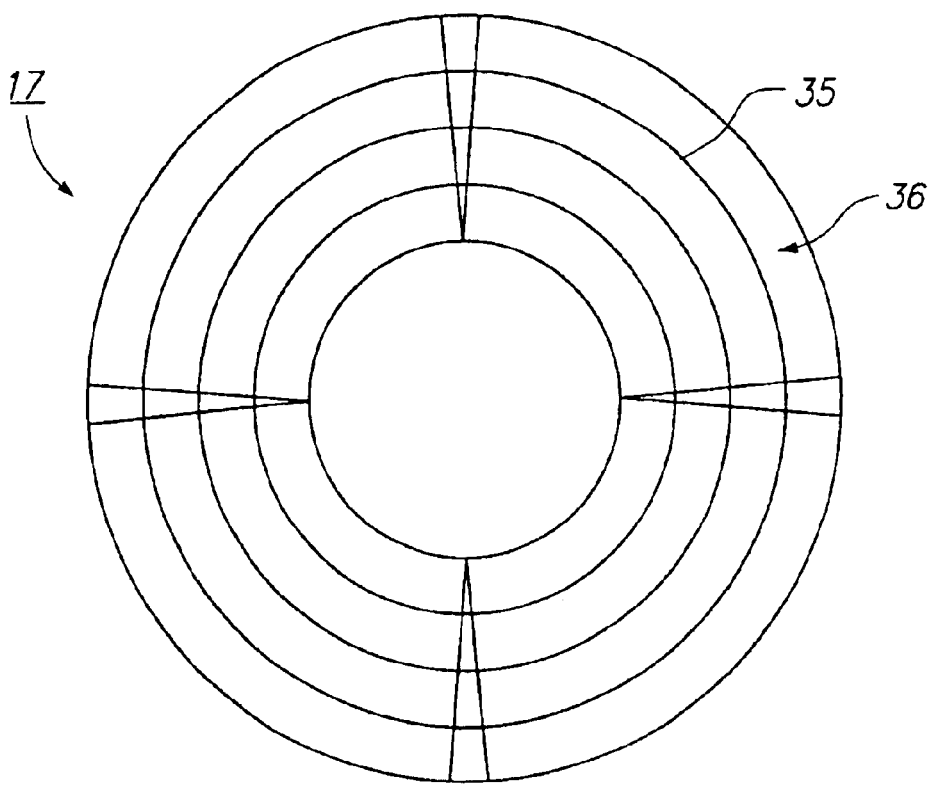
FIG. 3 is a top view of a computer storage disk in the disk drive.

Data storage disk 17 is a magnetic disk, optical disk, or any other type of storage disk having concentric data storage tracks defined on one or both of its storage surfaces. A close-up view of these tracks 35 is shown in FIG. 3. Data storage disk 17 is rotated inside disk drive 11 while data is read from/written to its tracks. Although only one data storage disk 17 is shown, more than one disk may be included in disk drive 11.

Transducer head 19 may be a giant magneto-resistive (GMR) head, or similar device, that is capable of reading data from, and writing data to, data storage disk 17. Transducer head 19 is associated in a "flying" relationship over a storage surface 36 of disk 17, meaning that it is movable relative to, and over, storage surface 36 in order to read and write data on storage surface 36.

During reading, head 19 senses flux transitions as it "flies" in close proximity to a selected channel on disk 17. These flux transitions 37 are provided to pre-amplifier 20. Pre-amplifier 20 is a voltage pre-amplifier that amplifies the flux transitions from millivolts (mV) to volts (V). Resulting pre-amplified analog signal ("read signal") 39 is provided to VGA 21. VGA 21 amplifies read signal 39 and provides a resulting amplified read signal 40 to filter 22.

Filter 22 is an analog filter that equalizes amplified read signal 40. To this end, filter 22 is programmed in accordance with the data transfer rate of a data zone on disk 17 from which signal 40 ultimately originated. Resulting filtered signal 41 is subjected to sampling (including possible oversampling) and quantization within high-speed A/D converter 24. A/D converter 24 outputs digitized data 42 generated from signal 41.

Figure 4:
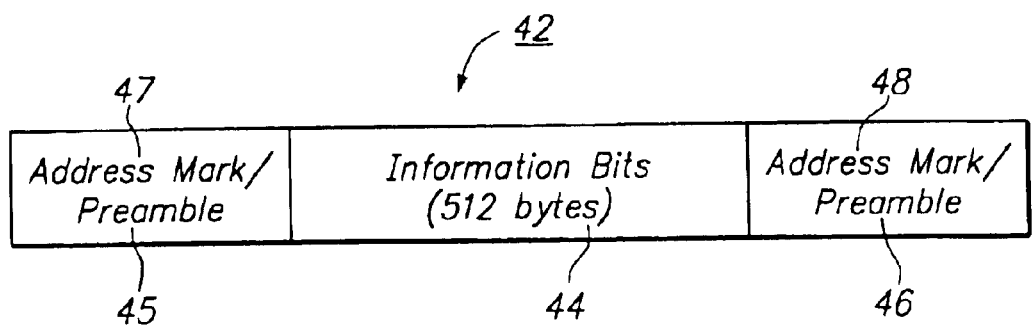
FIG. 4 is a diagram of a frame of data stored on/read from the computer storage disk.

Data 42 is stored in asynchronous samples buffer 25. Buffer 25 is labeled "asynchronous" because it is not part of a feedback loop/PLL 50. A PLL is used to reduce the phase difference (or "phase error") between the synchronous digital data and the clock signal. Referring to FIG. 4, in this embodiment, data signal 42 includes data 44 (e.g., bits), with preambles 45 and 46 and address marks (AM) 47 and 48 at the beginning and end of the data 44.

In this regard, disk drives store data in frames/packets of, e.g., 512 bytes or "cells". An address mark is a string of bits at the beginning and end of the 512 bytes (data signal) that defines the beginning and end of a frame. A preamble is a string of "phase" bits within the address mark, which indicate the phase of the data signal. More particularly, the phase bits define a sinusoidal function having a phase that corresponds to the phase of the data signal. The preamble 45 at the beginning of data signal 44 may have a different phase than the preamble 46 at the end of data signal 44 due to mechanical and/or electrical irregularities in the disk drive. The difference between the phase of preamble 45 and the phase of preamble 46 defines the phase error of the data signal, as described below.

Multiplexer 26 selects between data from asynchronous samples buffer 25 and synchronous samples buffer 29 (which stores sampled data). Data from synchronous samples buffer 29 is selected when that data is to be resampled, such as in the iterative sampling process of section 2.0 below.

ITR 27 samples data from either asynchronous samples buffer 25 or synchronous samples buffer 29. ITR 27 samples the data at a clock signal that is generated by timing estimator 32 (described below). The sampled data is stored in synchronous samples buffer 29. Buffer 29 is labeled "synchronous" because it is part of a feedback loop/PLL 50.

Detector 30 receives data 51 from synchronous samples buffer 29 and performs a detection operation on that data. In more detail, data stored on disk 17 may be coded prior to storage using an error correcting code, which means that the sampled data is also coded. Detector 30 is a Viterbi detector which decodes (i.e., removes) intersymbol interference (ISI) in the sampled data and determines the identity of bits in that data. One or more other detectors for detecting codes, timing and/or ISI could be added after detector 30. There may be iteration between these one or more other detectors in order to improve detection of codes, timing and/or ISI. The bits are identified based on voltage levels in the data. That is, detector 30 determines whether a bit is a "1" or a "0" based on other data within the data. The more data that detector 30 can reference in the signal, the more accurate the resulting bit decisions are.

When identifying the bits, detector 30 makes both "final" bit decisions 54 and "fast" bit decisions 56. Accuracy is more important than speed in the final bit decisions, whereas speed is more important than accuracy in the fast bit decisions. There are two reasons for this. First, the final bit decisions are used in generating the output of disk drive 11 and, therefore, should be as accurate as possible. Second, the fast bit decisions are used in feedback loop/PLL 50 to improve timing; hence, time delays should be reduced as much as possible. The fast bit decisions, unlike the final bit decisions, are therefore made more quickly and without common noise reduction processing. Typically, the fast bit decisions do not take into account much data (e.g., 4 bits) following the current bit. By contrast, the final bit decisions take into account larger amounts of data (e.g., 20 bits) following the current bit, resulting in a more accurate bit determination. It is noted that if the data output of detector 30 is buffered, the fast bit decisions are not needed per se.

Timing estimator 32, which includes a phase detector (not shown) and other circuitry, receives bit decisions 56 from detector 30, along with sampled data 57 from synchronous samples buffer 29. Timing estimator 32 determines phase errors, meaning phase differences, between the bit decisions and sampled data 57. This is done by generating an "ideal" waveform from the bit decisions and comparing that ideal waveform to an "actual" waveform generated from sampled data 57 (the "original" data). The difference between the two waveforms is the phase error. Timing estimator 32 uses this phase error to correct the phase of a clock signal 59 that is output to ITR 27.

Zero phase start circuitry 34 determines the initial phase error in a frame of data (FIG. 4) using the preambles 45, 46 at the beginning and end of that frame. This initial phase error is used in generating clock signal 59 to sample data (i.e., data signal) from asynchronous samples buffer 25.

Figure 5:
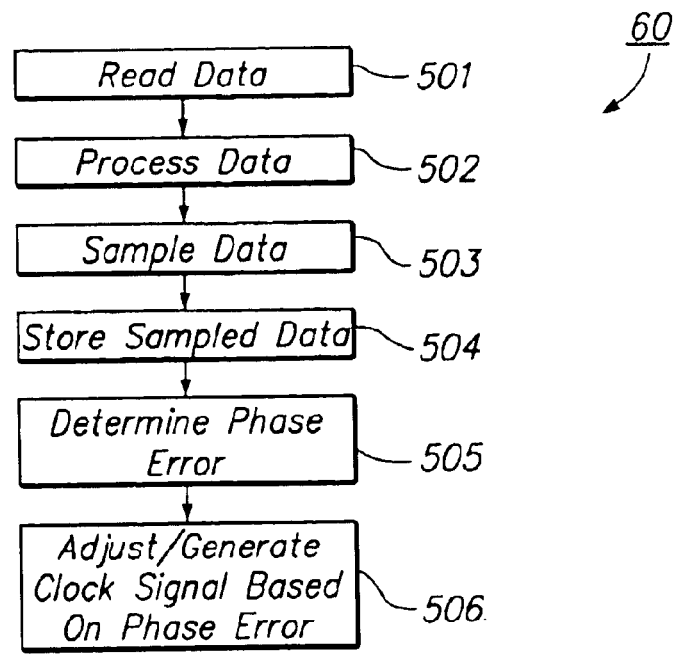
FIG. 5 is a flowchart showing a process for adjusting a clock signal to correct a phase error in data read by the disk drive.

Referring to FIG. 5, a process 60 is shown for obtaining the phase error of the data and for generating a clock signal which reduces phase errors in subsequently-sampled data.

Process 60 reads (501) data from storage medium 17 using transducer head 19, processes (502) the read data using preamplifier 20, VGA 21 and filter 22, and samples (503) the processed data using A/D converter 24. The resulting digitized signal 42 is obtained from A/D converter 24 and stored (504) in asynchronous samples buffer 25. Timing estimator 32 and associated circuitry determines (505) the phase error in the data signal using the data in asynchronous samples buffer 25. Described below in sections 1.0, 2.0 and 3.0 are several methods for determining the phase error using the circuitry of FIG. 2. Once the phase error has been detected, process 60 generates and adjusts (506) clock signal 59 using the phase error. This is done by adjusting the phase of the clock signal in accordance with the phase error. A crystal phase mixer (not shown) in timing estimator 32 may be used to produce the clock signal. Clock signal 59 is applied to ITR 27 to sample data from asynchronous samples buffer 25 or synchronous samples buffer 29.

One way of determining timing for clocking data via ITR 27 is to use a controller 38, timing detector 43, and a disk-locked clock 53. Timing detector 43 measures timing of spokes on data storage disk 17 (via data obtained from A/D converter 24) and provides the resulting timing information to controller 38. Controller 38 executes a routine in software, in this embodiment a PLL, to provide a clock update signal based on the timing information from timing detector 43. The clock update signal is provided to disk-locked clock 53, where the clock signal generated by disk-locked clock 53 is updated based on the timing signal and provided to timing estimator 32, from which it is supplied to ITR 27. While timing may be obtained from disk-locked clock 53 at any point in the operation of the disk drive, it is particularly advantageous to obtain the timing from disk-locked clock 53 prior to the other methods described herein.

Other ways of determining timing/phase error are described in sections 1.0, 2.0 and 3.0 below.

1.0 Determining the Phase Error Using Preambles

Figure 6:
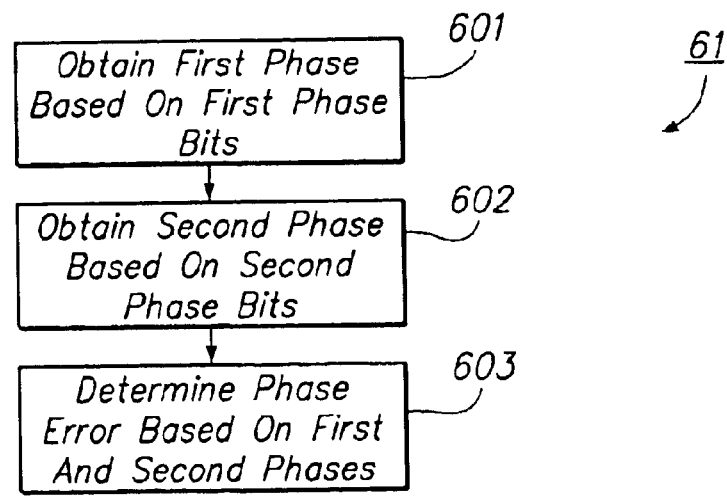
FIG. 6 is a flowchart showing a process for determining the phase error.

Process 61 (FIG. 6) determines (505) the phase error using preambles from the data stored in asynchronous samples buffer 25. Zero phase start circuitry 34 performs process 61. Process 61 may be performed at any time to determine the phase error; however, it is particularly advantageous if performed prior to the iterative sampling of feedback loop/PLL 50 (see below). This is because process 61 does not require sampled data from synchronous samples buffer 29 in order to determine the phase error.

Process 61 reads a target data frame from asynchronous samples buffer 25. Process 61 obtains (601) a first phase of the target frame based on the preamble 45 at the beginning of the target frame (see FIG. 4). That is, process 61 reads the "start" preamble, generates a sinusoidal function from the phase bits in that preamble, and determines the phase of that function relative to a start/end point of the data cell in which preamble 45 resides. This defines the initial phase of the data. Process 61 obtains (602) a second phase based on the preamble 46 at the end of the data frame. As above, process 61 reads the "end" preamble, generates a sinusoidal function from the phase bits in that preamble, and determines the phase of that function relative to a start/end point of the data cell in which preamble 46 resides. This defines the final phase of the data.

Figure 7:
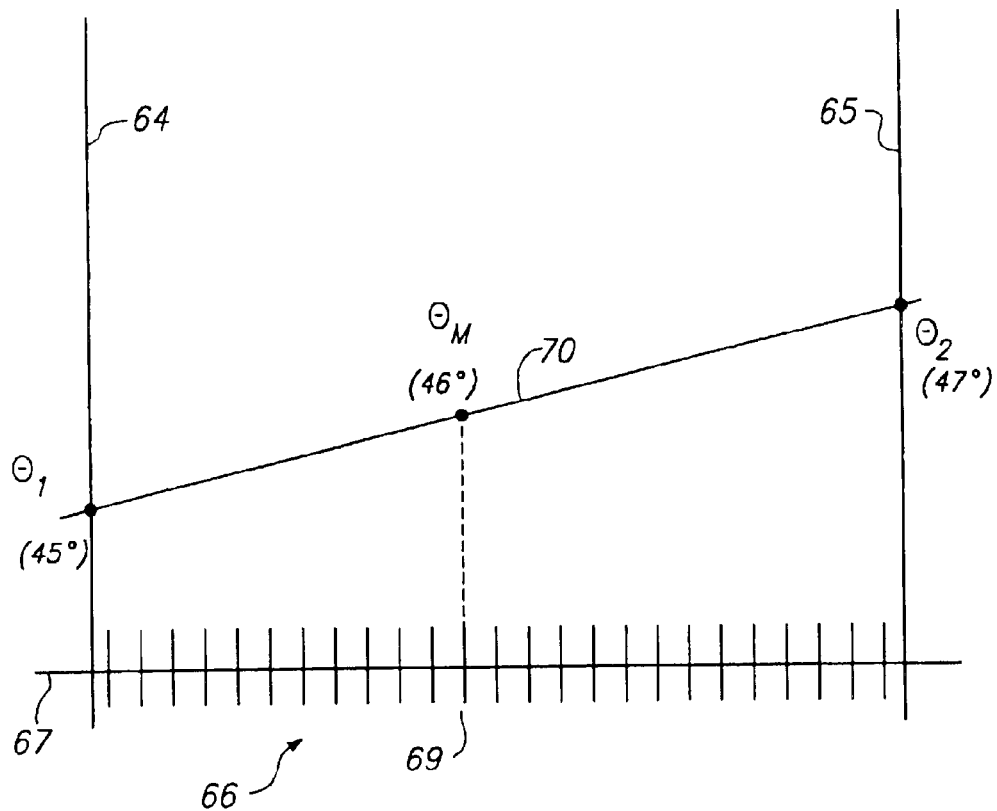
FIG. 7 is a plot showing how the phase error is determined according to the process of FIG. 6.

Process 61 determines (603) the phase error for a data signal in a frame of data using the initial and final phases. The phase error is determined by performing an interpolation between the initial and final phases of the data frame. For example, referring to FIG. 7, the initial phase ($\theta_1$) of a data frame is shown plotted on axis 64, the final phase ($\theta_2$) of the data frame is shown plotted on axis 65, and data 66 of the data frame is shown plotted on axis 67. To determine the phase of data (e.g., bit) 69, process 61 performs a linear interpolation between $\theta_1$ and $\theta_2$. As shown in FIG. 7, the linear interpolation produces a line 70 between the two phases $\theta_1$ and $\theta_2$. The phase error of data 69 is determined by correlating the data to line 70. For instance, if $\theta_1$ is 45° and $\theta_2$ is 47°, the phase ($\theta_M$) of data 69 precisely in the middle of data 66 is 46°. The estimated phase change is the difference between $\theta_M$ and $\theta_1$.

The resulting phase error is used to adjust clock signal 59 to clock ITR 27. For example, the phase error may be added to a clock signal with a 45° phase to sample the data in buffer 25. The resulting sampled data is stored in synchronous samples buffer 29. From there, the data may be re-sampled, as described below, to decrease errors therein.

It is noted that the invention is not limited to using linear interpolation. Any type of interpolation may be used to find the phase error. For example, non-linear interpolation, such as parabolic or cubic interpolation may be used. Also, the invention is not limited to using two preambles at the beginning and end of data. One or more preambles may be included within data 66 itself, giving zero phase start circuit 24 the ability to look at different phases. Interpolations may then be performed between the phases at each preamble, which, since they are closer, provide for a more accurate phase error determination.

2.0 Determining the Phase Error Using Iterative Sampling

Figure 8:
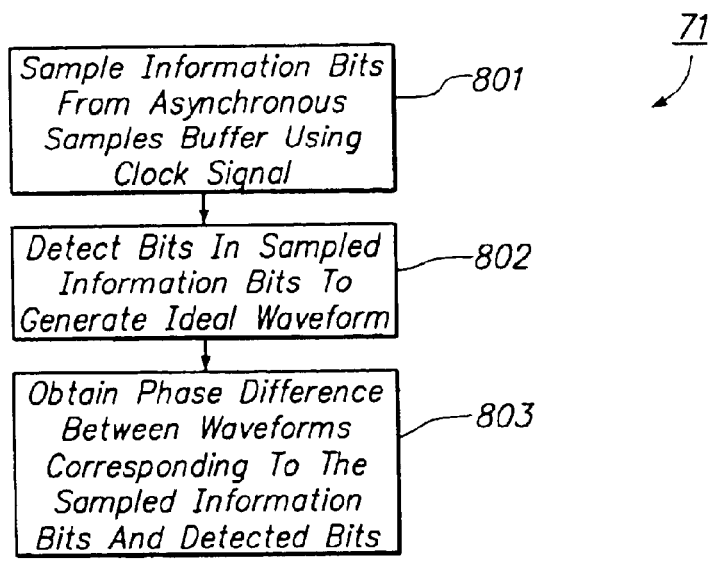
FIG. 8 is a flowchart showing another process for determining the phase error.

Referring to FIG. 8, a process 71 is shown, which may be performed following process 61 or independently thereof. Process 71 samples (801) data from asynchronous samples buffer 25. This is done using the clock signal generated by process 61 above or using an initial clock signal that was set beforehand in timing estimator 32.

Both detector 30 and timing estimator 32 read the sampled data from synchronous samples buffer 29. Timing estimator 32 generates a waveform based on that sampled data. As noted above, detector 30 detects (802) bits in the data at a high rate ("fast bits") and at a relatively lower rate ("final bits"). The fast bits are sent back through feedback loop/PLL 50 to timing estimator 32 via multiplexer 31. The fast bits are not stored in buffer 55 which is at the other output of detector 30.

Figure 9:
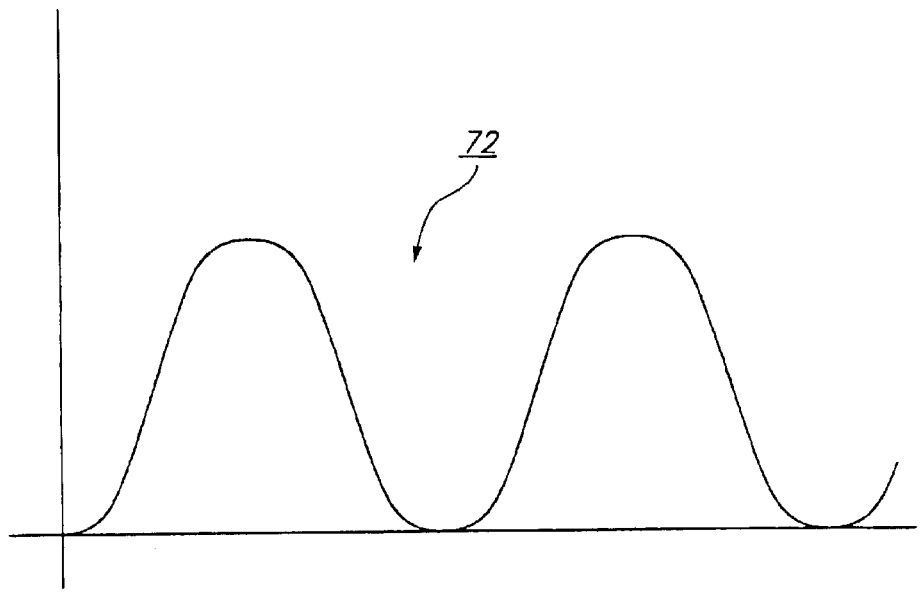
FIG. 9 shows an ideal waveform of data that is used in correcting the phase error in the process of FIG. 8.

Timing estimator 32 determines a phase error in the data. An ideal waveform generator 33 in timing estimator 32 obtains (802) an ideal waveform from fast bits. This is done by reconstructing a substantially noiseless (or "ideal") waveform from the fast bits. An example of an ideal waveform 72 produced by ideal waveform generator 33 is shown in FIG. 9. Timing estimator 32 obtains (803) the phase error in the data using this ideal waveform and a actual waveform. Timing estimator 32 generates the actual waveform using sampled bits (from synchronous samples buffer 29) that correspond to the bits detected by detector 30 and used to generate the ideal waveform. To obtain the phase error, timing estimator 32 determines the difference between the ideal waveform and the actual waveform.

The phase error is used to correct the clock signal, as was the case above. As noted, a crystal phase mixer (not shown)

in timing estimator 32 may be used to maintain the clock signal. An average phase error may be used to adjust the clock signal instead of a single-phase error, since the averaging process reduces the effects of noise and other extraneous signals in the phase error.

Averaging may be performed using a loop filter (not shown) in timing estimator 32. In this embodiment, the loop filter is a proportional integral (PI) filter that contains a proportional term and an integral term followed by an integrator term. The proportional term multiplies the filter input by a first coefficient ($\alpha$) and the integral term uses a second coefficient ($\beta$) to integrate the inputs to the loop filter, namely the phase errors, over time to generate and average phase error.

Once clock signal 59 has been adjusted, clock signal 59 is used to sample new data out of asynchronous samples buffer 25 or to re-sample the same data already stored in synchronous samples buffer 29. Re-sampling the same data stored in synchronous samples buffer 29 before it is finally output increases the accuracy of the final data. If re-sampling occurs, process 71 is repeated using the re-sampled data. That is, bits are detected in the re-sampled data, the phase error of the re-sampled data is determined based on the detected bits, and a clock signal is adjusted based on the phase error. As above, the clock signal may be used to sample original data from asynchronous samples buffer 25 or it may be used to perform yet another sampling iteration on the data stored in synchronous samples buffer 29.

3.0 Determining the Phase Error Using Smoothing

Figure 10:
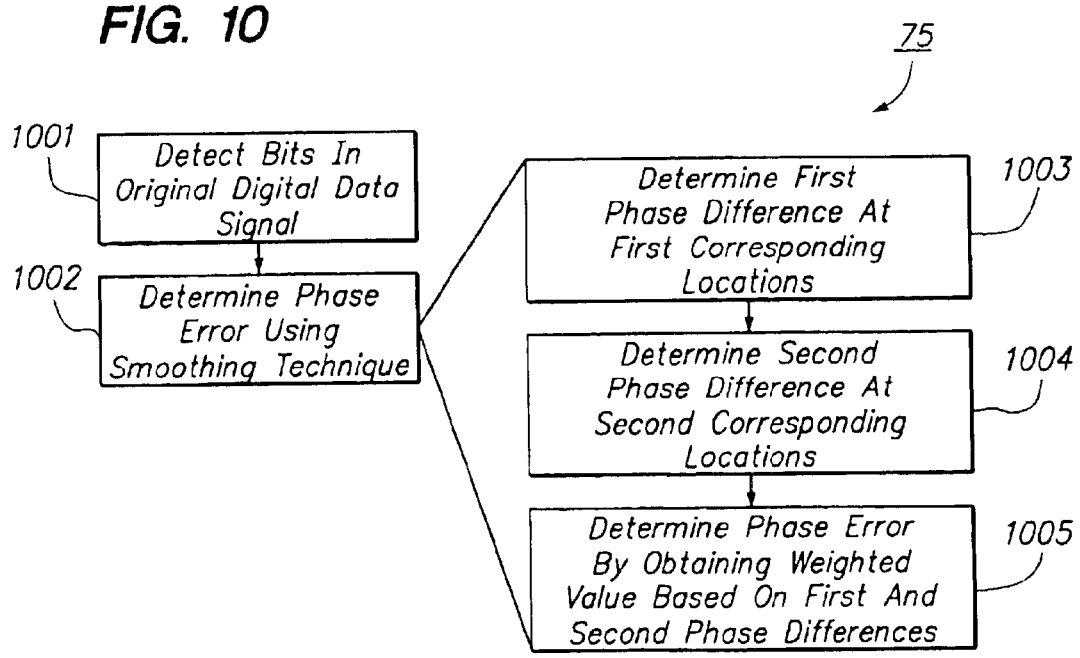
FIG. 10 is a flowchart showing still another process for determining the phase error.

Referring to FIG. 10, a process 75 is shown in which timing estimator 32 uses a smoothing technique to obtain the phase error in the data. Process 75 begins in the same manner as process 71 above. That is, process 75 samples data from asynchronous samples buffer 25. This is done using the clock signal generated by process 61 above or using an initial clock signal that has been set beforehand in timing estimator 32.

Both detector 30 and timing estimator 32 read the sampled data from synchronous samples buffer 29. As noted above, detector 30 detects (1001) bits in the data at a short latency, generating fast bits, and at a long latency, generating final bits. In this embodiment, the final bits are sent back through PLL 50, this time to a buffer 55, where they are stored until a frame of data (e.g., 512 bytes) has been detected by detector 30. Data from buffer 55 is provided to timing estimator 32 via multiplexer 31.

Timing estimator 32 determines (1002) a phase error of the data using a smoothing technique. In this embodiment, Kalman smoothing is used. Kalman smoothing is a process that uses data both before and after a current data sample to determine the phase error of the current sample. This concept is illustrated in FIG. 11.

Figure 11:
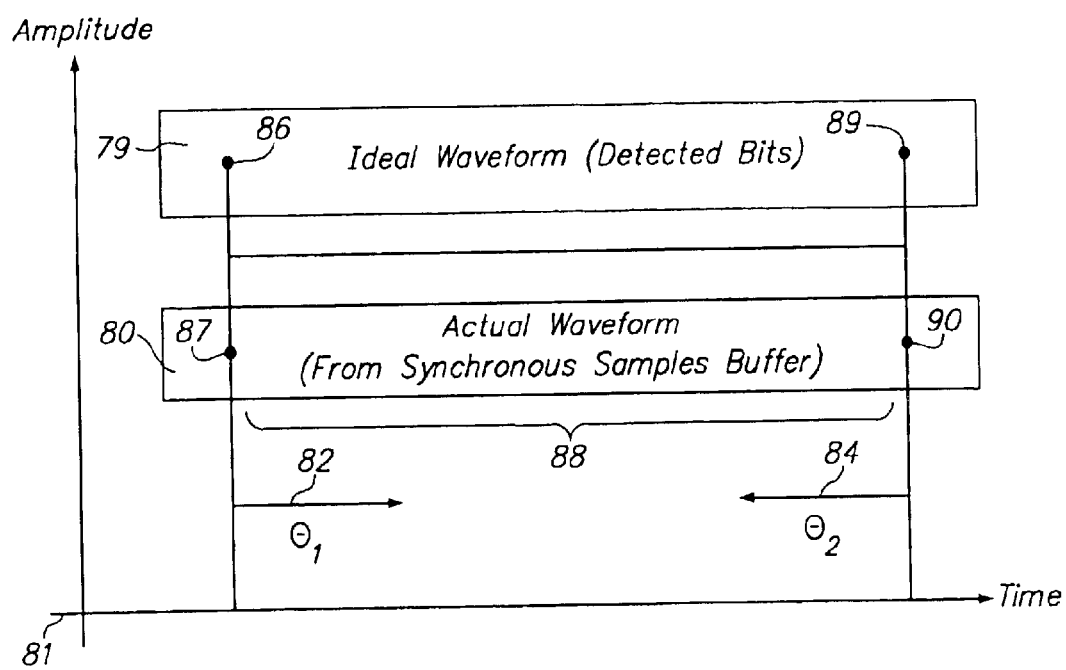
FIG. 11 is a plot showing how the phase error is determined according to the process of FIG. 10.

In FIG. 11, individual phase errors are determined between an ideal waveform 79 generated by ideal waveform generator 33 and an actual waveform 80 generated from "original" data in synchronous samples buffer 29. These individual phase errors are weighted at the PI filter of the timing estimator and added together to produce an overall phase error. The weights are assigned based on the amount of data prior to a current location. If there is more data before a current location (for forward sampling), a more accurate phase difference is determined, since more data can be used to make the determination. The reverse is true for backward sampling. Sampling continues in the directions of arrows 82, 84 (both forward and backward in time), with the weights varying accordingly at the locations. The resulting sampled and weighted values are added to determine the phase error at particular location.

Referring back to FIGS. 2 and 10, timing estimator 32 determines (1003) a first phase error between actual waveform 80 and the ideal waveform 79 at first locations 86, 87. Timing estimator 32 determines (1004) a second phase error between actual waveform 80 and ideal waveform 79 at second locations 89, 90. Timing estimator 32 determines (1005) the overall phase error, i.e., the phase difference between ideal waveform 79 and actual waveform 80, by obtaining a weighted value that is based on the first and second phase differences. The weighted values are then added to determine the phase error.

The phase error, $\theta_k$, at a $k^{th}$ data bit sample, is determined as follows:

$$\theta_k = \alpha_k^1 \theta_k^1 + \alpha_k^2 \theta_k^2,$$

where $\theta_k^1$ is the first phase difference, $\alpha_k^1$ is a weight assigned to first corresponding locations 86, 87, $\theta_k^2$ is the second phase difference, and $\alpha_k^2$ is a weight assigned to second corresponding locations 89, 90. Values for $\alpha_k^1$ and $\alpha_k^2$ are assigned based on the first and second locations, respectively. The value for $\alpha_k^1$ is larger than $\alpha_k^2$ if the sample k is closer to $\theta_2$ than to $\theta_1$, and the value for $\alpha_k^2$ is larger than $\alpha_k^1$ if the sample k is closer to $\theta_1$ than to $\theta_2$.

4.0 Architecture Implementations

Hardware implementations are shown for processes 60, 61, 71 and 75. Processes 60, 61, 71 and 75, however, are not limited to use with any particular hardware or software configuration; they may find applicability in any computing or processing environment. All or part of processes 60, 61, 71 and 75 may be implemented in hardware, software, or a combination of the two. All or part of processes 60, 61, 71 and 75 may be implemented in one or more computer programs executing on programmable computers that each include a processor, a storage medium readable by the processor (including volatile and non-volatile memory and/or storage elements), at least one input device, and one or more output devices. Program code may be applied to data entered using an input device to perform processes 60, 61, 71 and 75 and to generate output information. The output information may be applied to one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 60, 61, 71 and 75. All or part of processes 60, 61, 71 and 75 may be implemented as a computer-readable storage medium, configured with a computer program, where, upon execution, instructions in the computer program cause a computer to perform processes 60, 61, 71 and 75.

Thus, by way of example, an application-specific integrated circuit (ASIC) may be designed to perform the functions of PLL 50. Using an ASIC reduces the amount of hardware that must be included in disk drive 11. Processes 60, 61, 71 and 75 are also not limited to the disk drive system shown in FIG. 2. In fact, they can be used in any PLL that is used to correct phase errors in any feedback system. Any two or more of the techniques described herein may be used in combination.

Other embodiments not described herein are also within the scope of the following claims.

What is claimed is:

1. A method of determining a phase error in a data signal, the data signal comprising first phase bits, second phase bits, and data between the first and second phase bits, the method comprising:

obtaining a first phase based on the first phase bits, wherein the first phase bits define a first function and the first phase is obtained by determining the phase of the first function;

obtaining a second phase based on the second phase bits, wherein the second phase bits define a second function and the second phase is obtained by determining the phase of the second function; and determining a phase error of the data based on the first and second phases.

2. The method of claim 1, wherein the data signal comprises third phase bits, fourth phase bits, and data between the third and fourth phase bits, and the method further comprises:

obtaining a third phase based on the third phase bits;

obtaining a fourth phase based on the fourth phase bits; and determining a phase error of the data between the third and fourth phase bits based on the third and fourth phases.

3. The method of claim 1, wherein the phase error is determined by performing an interpolation using the first and second phases.

4. The method of claim 3, wherein the interpolation comprises a linear interpolation.

5. The method of claim 1, further comprising:

storing the data signal in a buffer;

adjusting a clock signal based on the phase error; and sampling the data from the buffer using the clock signal.

6. The method of claim 5, further comprising:

detecting bits in the sampled data;

generating a first waveform from the detected bits;

generating a second waveform from the sampled data;

obtaining a phase difference between the first and second waveforms; and adjusting the clock signal based on the phase difference.

7. The method of claim 6, further comprising:

re-sampling the data from the buffer using the clock signal.

8. The method of claim 6, further comprising:

storing the sampled data in a second buffer; and sampling the sampled data from the second buffer using the clock signal.

9. The method of claim 1, wherein the first and second phase bits comprise parts of first and second data preambles, respectively.

10. A method of determining a phase error in a data signal, comprising:

detecting bits in an original data signal, wherein the detecting is performed using a Viterbi detector;

determining a phase error in the original data signal based on the detected bits;

adjusting a clock signal based on the phase error;

sampling the original data signal with the clock signal to produce a sampled data signal; and repeating the detecting, determining, adjusting and sampling using the sampled data signal instead of the original data signal.

11. The method of claim 10, wherein the phase error is determined by comparing a waveform that corresponds to the detected bits to a waveform that corresponds to the original data signal.

12. The method of claim 10, wherein the original data signal is synchronously sampled from a buffer.

13. The method of claim 10, further comprising storing the original data signal in a buffer.

14. A method of determining a phase error in an original data signal stored in a buffer, comprising:

detecting bits in the original data signal; and determining a phase error in the original data signal based on the detected bits using a smoothing technique, wherein the smoothing technique comprises:

determining a first phase difference between waveforms corresponding to the original data signal and the detected bits at first corresponding locations in the original data signal and the detected bits;

determining a second phase difference between the waveforms corresponding to the original data signal and the detected bits at second corresponding locations in the original data signal and the detected bits; and determining the phase error by obtaining a weighted value that is based on the first and second phase differences and the first and second corresponding locations.

15. The method of claim 14, wherein the phase error, $\theta_k$, for a "$k^{th}$" data bit, is determined as follows:

$$\theta_k = \alpha_k^1 \theta_k^1 + \alpha_k^2 \theta_k^2,$$

where $\theta_k^1$ is the first phase difference, $\alpha_k^1$ is a weight assigned to the first corresponding locations, $\theta_k^2$ is the second phase difference, and $\alpha_k^2$ is a weight assigned to the second corresponding locations.

16. The method of claim 15, wherein $\alpha_k^1$ and $\alpha_k^2$ are assigned based on the first and second corresponding locations, respectively.

17. The method of claim 14, wherein the smoothing technique comprises Kalman smoothing.

18. An apparatus for determining a phase error in a data signal, the data signal comprising first phase bits, second phase bits, and data between the first and second phase bits, the apparatus comprising circuitry which:

obtains a first phase based on the first phase bits, wherein the first phase bits define a first function and the first phase is obtained by determining the phase of the first function;

obtains a second phase based on the second phase bits, wherein the second phase bits define a second function and the second phase is obtained by determining the phase of the second function; and determines a phase error of the data in the data signal based on the first and second phases.

19. The apparatus of claim 18, wherein the phase error is determined by performing an interpolation using the first and second phases.

20. The apparatus of claim 19, wherein the interpolation comprises a linear interpolation.

21. The apparatus of claim 18, further comprising:

a buffer that stores the data signal;

a timing estimator circuit that adjusts a clock signal based on the phase error; and a sampling circuit that samples the data from the buffer using the clock signal.

22. The apparatus of claim 21, further comprising a detector that detects bits in the sampled data;
   wherein the timing estimator circuit obtains a phase difference between a first waveform corresponding to the detected bits and a second waveform corresponding to the sampled data signal, and adjusts the clock signal based on the phase difference.

23. The apparatus of claim 22, wherein the sampling circuit re-samples the data from the buffer using the clock signal.

24. The apparatus of claim 21, wherein the sampling circuit comprises an interpolated timing recovery circuit.

25. The apparatus of claim 18, wherein the first and second phase bits comprise parts of first and second data preambles, respectively.

26. An apparatus for determining a phase error in a data signal, comprising:
   a detector that detects bits in an original data signal, wherein the detector comprises a Viterbi detector;
   a timing estimator circuit that determines a phase error in the original data signal based on the detected bits, and adjusts a clock signal based on the phase error; and
   a sampling circuit that samples the original data signal with the clock signal to produce a sampled data signal.

27. The apparatus of claim 26, wherein the timing estimator determines the phase error by comparing waveforms that correspond to the detected bits to the original data signal.

28. The apparatus of claim 26, wherein the original data signal comprises synchronously sampled data sampled from a buffer.

29. The apparatus of claim 26, further comprising a buffer that stores the original data signal.

30. An apparatus for determining a phase error in an original data signal stored in a buffer, comprising:
   a detector that detects bits in the original data signal; and
   a timing estimator circuit that determines a phase error in the original data signal based on the detected bits using a smoothing technique, wherein the smoothing technique comprises:
      determining a first phase difference between waveforms corresponding to the original data signal and the detected bits at first corresponding locations in the original data signal and the detected bits;
      determining a second phase difference between waveforms corresponding to the original data signal and the detected bits at second corresponding locations in the original data signal and the detected bits; and
      determining the phase error by obtaining a weighted value that is based on the first and second phase differences and the first and second corresponding locations.

31. The apparatus of claim 30, wherein the phase error, $\theta_k$, for a "$k^{th}$" data bit, is determined as follows:

$$\theta_k = \alpha_k^1 \theta_k^1 + \alpha_k^2 \theta_k^2,$$

where $\theta_k^1$ is the first phase difference, $\alpha_k^1$ is a weight assigned to the first corresponding locations, $\theta_k^2$ is the second phase difference, and $\alpha_k^2$ is a weight assigned to the second corresponding locations.

32. The apparatus of claim 31, wherein $\alpha_k^1$ and $\alpha_k^2$ are assigned based on the first and second corresponding locations, respectively.

33. The apparatus of claim 30, wherein the smoothing technique comprises Kalman smoothing.

34. An apparatus for determining a phase error in a data signal, the data signal comprising first phase bits, second phase bits, and data between the first and second phase bits, the apparatus comprising:
   circuitry which (i) obtains a first phase based on the first phase bits, wherein the first phase bits define a first function and the first phase is obtained by determining the phase of the first function, (ii) obtains a second phase based on the second phase bits, wherein the second phase bits define a second function and the second phase is obtained by determining the phase of the second function, and (iii) determines a phase error of the data in the data signal based on the first and second phases;
   a buffer that stores the data signal;
   a timing estimator circuit that adjusts a clock signal based on the phase error; and
   a sampling circuit that samples the data signal from the buffer using the clock signal.

35. An apparatus for determining a phase error in an original data signal stored in a buffer, comprising:
   a detector that detects bits in the original data signal; and
   a timing estimator circuit that determines a phase error in the original data signal based on the detected bits using a smoothing technique;
   wherein the smoothing technique comprises:
      determining a first phase difference between waveforms corresponding to the original data signal and the detected bits at first corresponding locations in the original data signal and the detected bits;
      determining a second phase difference between waveforms corresponding to the original data signal and the detected bits at second corresponding locations in the original data signal and the detected bits; and
      determining the phase error by obtaining a weighted value that is based on the first and second phase differences and the first and second corresponding locations.

36. A computer-readable medium that stores computer-executable instructions for determining a phase error in a data signal, the data signal comprising first phase bits, second phase bits, and data between the first and second phase bits, the instructions causing a computer to:
   obtain a first phase based on the first phase bits, wherein the first phase bits define a first function and the first phase is obtained by determining the phase of the first function;
   obtain a second phase based on the second phase bits, wherein the second phase bits define a second function and the second phase is obtained by determining the phase of the second function; and
   determine a phase error of the data based on the first and second phases.

37. A computer-readable medium that stores computer-executable instructions for determining a phase error in a data signal, the instructions causing a computer to:
   detect bits in an original data signal, wherein the detecting is performed using a Viterbi detector;
   determine a phase error in the original data signal based on the detected bits;
   adjust a clock signal based on the phase error;
   sample the original data signal with the clock signal to produce a sampled data signal; and
   repeat the detecting, determining, adjusting and sampling using the sampled data signal instead of the original data signal.

38. A computer-readable medium that stores computer-executable instructions for determining a phase error in an original data signal stored in a buffer, the instructions causing a computer to:
  detect bits in the original data signal; and
  determine a phase error in the original data signal based on the detected bits using a smoothing technique, wherein the smoothing technique comprises:
    determining a first phase difference between waveforms corresponding to the original data signal and the detected bits at first corresponding locations in the original data signal and the detected bits;
    determining a second phase difference between the waveforms corresponding to the original data signal and the detected bits at second corresponding locations in the original data signal and the detected bits; and
    determining the phase error by obtaining a weighted value that is based on the first and second phase differences and the first and second corresponding locations.

39. A method of determining a phase error in a data signal, the data signal comprising first phase bits, second phase bits, and data between the first and second phase bits, the method comprising:
  obtaining a first phase based on the first phase bits;
  obtaining a second phase based on the second phase bits;
  determining a phase error of the data based on the first and second phases;
  storing the data signal in a buffer;
  adjusting a clock signal based on the phase error;
  sampling the data from the buffer using the clock signal;
  detecting bits in the sampled data;
  generating a first waveform from the detected bits;
  generating a second waveform from the sampled data;
  obtaining a phase difference between the first and second waveforms; and
  adjusting the clock signal based on the phase difference.

40. The method of claim 39, further comprising:
  re-sampling the data from the buffer using the clock signal.

41. The method of claim 39, further comprising:
  storing the sampled data in a second buffer; and
  sampling the sampled data from the second buffer using the clock signal.

42. A method of determining a phase error in an original data signal stored in a buffer, comprising:
  detecting bits in the original data signal; and
  determining a phase error in the original data signal based on the detected bits using a smoothing technique, wherein the smoothing technique comprises Kalman smoothing.

43. An apparatus for determining a phase error in a data signal, the data signal comprising first phase bits, second phase bits, and data between the first and second phase bits, the apparatus comprising:
  circuitry which:
    obtains a first phase based on the first phase bits;
    obtains a second phase based on the second phase bits; and
    determines a phase error of the data in the data signal based on the first and second phases;
  a buffer that stores the data signal;
  a timing estimator circuit that adjusts a clock signal based on the phase error;
  a sampling circuit that samples the data from the buffer using the clock signal; and
  a detector that detects bits in the sampled data;
  wherein the timing estimator circuit obtains a phase difference between a first waveform corresponding to the detected bits and a second waveform corresponding to the sampled data signal, and adjusts the clock signal based on the phase difference.

44. The apparatus of claim 43, wherein the sampling circuit re-samples the data from the buffer using the clock signal.

45. An apparatus for determining a phase error in an original data signal stored in a buffer, comprising:
  a detector that detects bits in the original data signal; and
  a timing estimator circuit that determines a phase error in the original data signal based on the detected bits using a smoothing technique, wherein the smoothing technique comprises Kalman smoothing.

* * * * *